Aug. 13, 1940.　　　　A. J. KLECKNER　　　　2,211,273
HOOK
Filed April 10, 1939　　　2 Sheets-Sheet 1
Fig. 1.
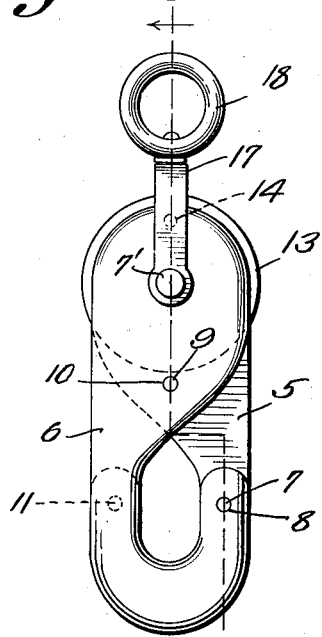
Fig. 2.
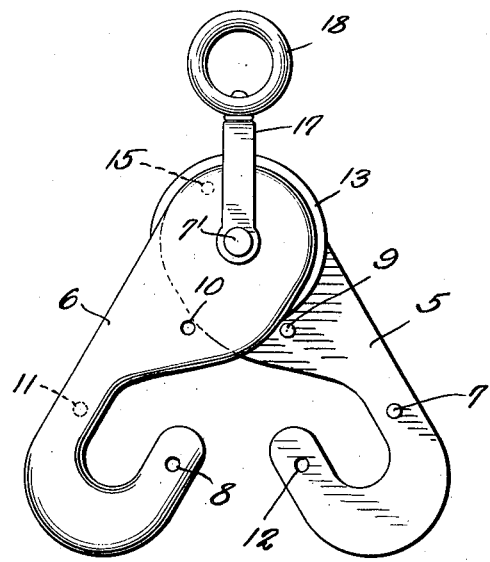
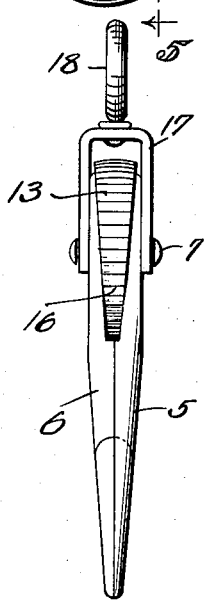
Fig. 3.
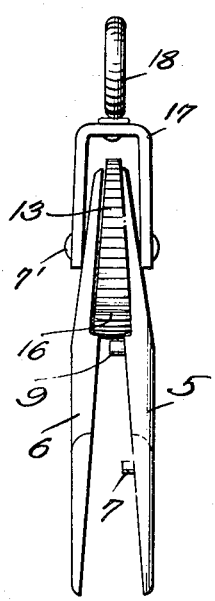
Fig. 4.
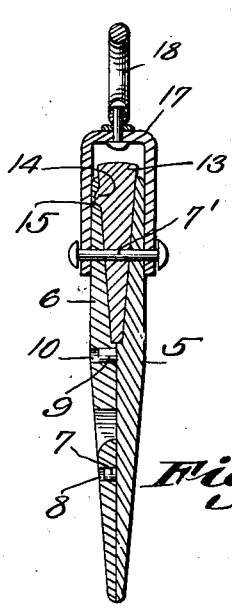
Fig. 5.
A. J. Kleckner
INVENTOR.
BY *C. A. Snow & Co.*
ATTORNEYS.

Aug. 13, 1940. A. J. KLECKNER 2,211,273
HOOK
Filed April 10, 1939 2 Sheets-Sheet 2
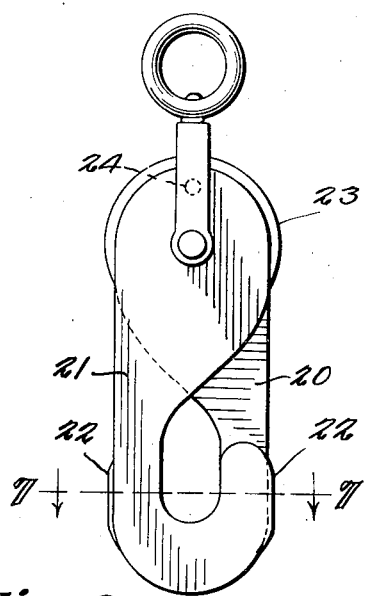
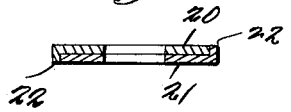
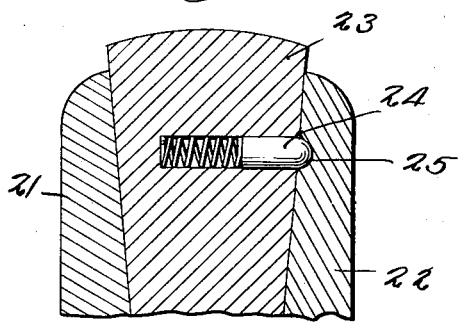
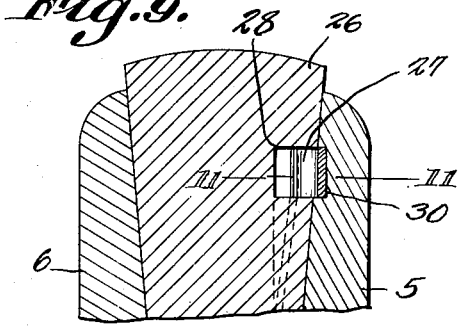
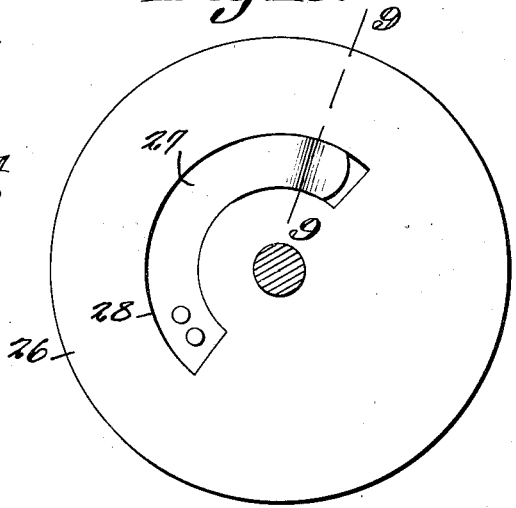
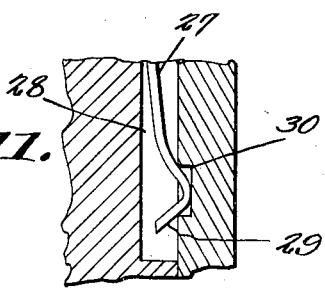
A. J. Kleckner
INVENTOR.
BY *CA Snow & Co.*
ATTORNEYS.

Patented Aug. 13, 1940

2,211,273

UNITED STATES PATENT OFFICE 2,211,273

HOOK

Alfred J. Kleckner, Neillsville, Wis.

Application April 10, 1939, Serial No. 267,091

2 Claims. (Cl. 24—232)

This invention relates to hooks, and primarily to hooks used as bull snaps or in connection with harness, halters or the like.

The primary object of the invention is to provide a hook of this character which, when moved to its closed or active position, will be securely held in its holding position, against accidental displacement.

An important object of the invention is to provide a hook of this character which is held in its holding position by a wedging action set up between a pair of cooperating hook members, the hook being entirely free of spring devices which are perishable, and break readily, rendering the hook inoperative to accomplish its purpose.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of a hook constructed in accordance with the invention, showing the hook in its closed or holding position.

Figure 2 is a view illustrating the hook in its open position.

Figure 3 is an elevational view illustrating one edge of the hook in its closed or holding position.

Figure 4 is an elevational view of one edge of the hook, illustrating the hook members as in their open positions.

Figure 5 is a vertical sectional view on line 5—5 of Figure 1.

Figure 6 is a side elevational view of a modified form of hook.

Figure 7 is a sectional view taken on line 7—7 of Figure 6.

Figure 8 is an enlarged fragmental sectional view illustrating the wedge locking means.

Figure 9 is an enlarged sectional view taken on line 9—9 of Figure 10, and illustrating a further modified form of the invention.

Figure 10 is an elevational view of one of the side faces of the locking wedge.

Figure 11 is a sectional view taken on line 11—11 of Figure 9.

Referring to the drawings in detail, the hook comprises a body portion including hook members 5 and 6 which are pivotally connected by means of the pivot pin 7' which extends through the upper ends of the hook members.

The reference character 7 designates a pin extending inwardly from the inner face of the hook member 5, the pin being provided to extend into the opening 8 of the opposed hook member 6. A pin indicated at 9 is also formed on the hook member 5 and is adapted to be positioned in the opening 10 of the hook member 6. A pin indicated at 11 extends inwardly from the hook member 6 and is adapted to extend into the opening 12 of the hook member 5, when the hook members are moved to their closed or gripping position.

As clearly shown by Figure 5 of the drawings, the inner surfaces of the hook members 5 and 6 are beveled at their upper ends, and receive the locking disk 13, which is also pivotally mounted on the pivot pin 6. This locking disk 13 is also beveled, so that the wide portion thereof will move between the hook members 5 and 6, to move the hook members with respect to each other. It will be obvious that when the locking disk 13 is moved to the position as shown by Figure 5 of the drawings, the hook members will be locked in their closed positions, and can only be moved to their open positions, by rotating the locking disk to the position as shown by Figure 4. An enlargement 14 is provided on the locking disk 13 and is adapted to seat in the recess 15 of the hook member 6, holding the locking disk against accidental movement, while the hook is in use. In order that the locking disk may be readily rotated, the periphery thereof is knurled as at 16.

The reference character 17 designates a yoke, which is also pivotally connected with the body portion of the hook, the yoke being provided with a ring 18, which is swiveled thereto, to permit the hook to be rotated with respect to its supporting chain.

In the modified form of the invention as shown by Figure 6 of the drawings, the adjacent side faces of the hook members 20 and 21 are beveled, so that when the hook members are moved to their holding positions, or the positions as shown by Figure 6 of the drawings, the hook members will be wedged into close engagement with each other.

Formed on the outer edge of each hook member, is a flange indicated at 22, and these flanges are adapted to engage the edges of the adjacent hook member restricting movement of one hook member with respect to the other, in opposite directions.

As shown by Figure 8 of the drawings, the wedge-shaped member which is indicated by the reference character 23, and which moves between the upper ends of the hooks, is provided with a bore in which the spring-pressed pin 24 is mounted, the spring-pressed pin adding a rounded end to fit within the recess 25 formed in one of the hook members.

In the form of the invention as shown by Figure 9 of the drawings, the locking disk 26 is provided with a curved groove 28 in which the spring member 27 is held, one end of the spring member 27 extending outwardly so that it bears against the adjacent surface of one of the hook members, the hook member with which the spring engages, being formed with a recess 30 into which the spring member will move, when the hook members are moved to their holding or closed positions.

It will of course be understood that a slight pressure to rotate the locking disk, will result in the spring member becoming disengaged with the walls of the recess, to permit the free rotary movement of the locking disk.

The spring member 27 has its free extremity extended rearwardly as at 29 providing an inclined surface so that the spring member will ride out of the recess 30 when it is desired to rotate the locking disk 26.

From the foregoing it will be seen that due to the construction shown and described, I have provided a springless hook which may be used in connection with harness, or in any other place where a hook is desirable, the hook being of a construction to be securely held to the article with which it is connected, against accidental displacement while in use.

What is claimed is:

1. A hook of the class described, comprising a yoke, a pair of hook members pivotally mounted within the yoke, the adjacent inner surfaces of the hook members at the inner ends thereof being beveled, a beveled locking disk mounted between the beveled surfaces of the hook members, said locking disk adapted to move said hook members into engagement with each other as the locking disk is rotated in one direction, and means for restricting pivotal movement of the hook members with respect to each other.

2. A hook of the class described comprising a yoke, a pair of hooks pivotally mounted within the yoke, the adjacent inner surfaces of the hook members being beveled, a beveled disk mounted for rotary movement between the hook members, pins extending from the inner surface of one of the hook members, the opposite hook member being formed with openings to receive said pins holding the hook members against pivotal movement with respect to each other, said disk having an enlargement, and one of said hook members having an opening to receive the enlargement, holding said disk normally against rotary movement.

ALFRED J. KLECKNER.